US007496588B2

(12) United States Patent
Wong et al.

(10) Patent No.: US 7,496,588 B2
(45) Date of Patent: Feb. 24, 2009

(54) METHOD AND APPARATUS FOR DATA INTEGRATION AND MANAGEMENT

(75) Inventors: Stanley Wong, Toronto (CA); Steve Hoskin, Brampton (CA); Xiao Feng Qian, Toronto (CA)

(73) Assignee: Siperian, Inc., Foster City, CA (US)

( * ) Notice: Subject to any disclaimer, the term of this patent is extended or adjusted under 35 U.S.C. 154(b) by 79 days.

(21) Appl. No.: 11/169,319

(22) Filed: Jun. 27, 2005

(65) Prior Publication Data
US 2006/0294151 A1   Dec. 28, 2006

(51) Int. Cl.
G06F 17/00 (2006.01)
(52) U.S. Cl. ............... 707/101; 707/102; 707/103 Z; 707/104.1; 707/9
(58) Field of Classification Search .............. 707/3, 707/10, 104.1, 9, 101, 102, 103 Z; 705/36, 705/26; 600/476
See application file for complete search history.

(56) References Cited

U.S. PATENT DOCUMENTS

| 5,600,832 | A | 2/1997 | Eisenberg et al. | |
|---|---|---|---|---|
| 5,956,499 | A | 9/1999 | Colgan | |
| 6,151,608 | A | 11/2000 | Abrams | |
| 6,324,541 | B1 | 11/2001 | De L'etraz et al. | |
| 6,523,041 | B1 * | 2/2003 | Morgan et al. | 707/102 |
| 6,542,896 | B1 | 4/2003 | Gruenwald | |
| 6,604,113 | B1 * | 8/2003 | Kenyon et al. | 705/36 R |
| 6,765,594 | B2 | 7/2004 | Hautt et al. | |
| 2002/0052551 | A1 * | 5/2002 | Sinclair et al. | 600/476 |
| 2003/0065659 | A1 | 4/2003 | Agarwal et al. | |
| 2003/0069780 | A1 | 4/2003 | Hailwood et al. | |
| 2003/0084016 | A1 | 5/2003 | Norgaard et al. | |
| 2003/0105887 | A1 | 6/2003 | Cox et al. | |
| 2003/0187716 | A1 | 10/2003 | Lee | |

(Continued)

FOREIGN PATENT DOCUMENTS

WO    WO 01/15030 A1    3/2001

(Continued)

OTHER PUBLICATIONS

Trieu C. Chieu et al., "Unified Solution for Procurement Integration and B 2 B stores", ACM, 2003, pp. 61-67.*

(Continued)

*Primary Examiner*—Thuy N Pardo
(74) *Attorney, Agent, or Firm*—Adeli & Tollen LLP

(57) ABSTRACT

A system for maintaining master reference data for entities is disclosed. The system includes multiple reference data sets at multiple different data storages. A reference data set for a particular entity uniquely identifies the particular entity. The system also includes a first master reference data set at a first data storage that is at least as reliable as a second reference data set at a second data storage. In some embodiments, the first data storage can be updated through real-time process or an offline process (e.g., a batch process). The first master reference data set includes at least one data record, and content metadata regarding the data record. In some embodiments, content metadata comprises lineage data that includes each preceding value that was contained in the data record. In some of these embodiments, lineage includes other factors that affected the present and previous values contained in the data record.

28 Claims, 12 Drawing Sheets

U.S. PATENT DOCUMENTS

| | | | |
|---|---|---|---|
| 2003/0197733 | A1 | 10/2003 | Beauchamp et al. |
| 2003/0212654 | A1 | 11/2003 | Harper et al. |
| 2003/0217333 | A1 | 11/2003 | Smith et al. |
| 2003/0236776 | A1 | 12/2003 | Nishimura et al. |
| 2004/0006506 | A1 | 1/2004 | Hoang |
| 2004/0093330 | A1* | 5/2004 | Westphal ................ 707/3 |
| 2004/0117358 | A1* | 6/2004 | von Kaenel et al. ........... 707/3 |
| 2004/0225629 | A1 | 11/2004 | Eder |
| 2004/0243613 | A1 | 12/2004 | Pourheidari |
| 2005/0044009 | A1* | 2/2005 | Stone et al. ............... 705/26 |
| 2005/0149539 | A1 | 7/2005 | Cameron et al. |
| 2005/0182785 | A1 | 8/2005 | Oswalt |
| 2005/0228805 | A1* | 10/2005 | Britton et al. ............ 707/100 |
| 2005/0257193 | A1 | 11/2005 | Falk et al. |
| 2005/0278270 | A1 | 12/2005 | Carr et al. |
| 2006/0031216 | A1* | 2/2006 | Semple et al. ............. 707/4 |
| 2006/0085437 | A1 | 4/2006 | Brodhun et al. |
| 2006/0242184 | A1 | 10/2006 | Shur et al. |
| 2006/0294151 | A1* | 12/2006 | Wong et al. ............... 707/200 |
| 2007/0027898 | A1 | 2/2007 | Jones et al. |
| 2007/0094286 | A1 | 4/2007 | Murthy et al. |
| 2007/0156766 | A1 | 7/2007 | Hoang et al. |
| 2007/0156767 | A1 | 7/2007 | Hoang et al. |
| 2007/0214179 | A1 | 9/2007 | Hoang et al. |

FOREIGN PATENT DOCUMENTS

| | | | |
|---|---|---|---|
| WO | WO 02/063491 | A2 | 8/2002 |
| WO | WO 03102867 | A1 | 12/2003 |
| WO | WO 2007002686 | A2 | 1/2007 |
| WO | WO 2007079467 | A2 | 7/2007 |
| WO | WO 2007081666 | A2 | 7/2007 |

OTHER PUBLICATIONS

Sanjay Ghemawat et al., "The Google File System", ACM, Oct. 2003, pp. 29-43.*

International Preliminary Report on Patentability for PCT/US2006/025017, mailing date Jan. 17, 2008, Siperian, Inc. International Preliminary Report on Patentability of corresponding PCT Patent Application.

Written Opinion for PCT/US2006/025017, mailing date Jul. 31, 2007, Siperian, Inc., International Search Report and Written Opinion of corresponding PCT Patent Application.

U.S. Appl. No. 11/957,398, filed Dec. 14, 2007, Hoang et al., Non-published commonly owned pending U.S. Patent Application.

Non-Final Office Action of U.S. Appl. No. 10/449,171, mailing date Nov. 23, 2005, Hoang et al., Non-Final Office Action of a commonly owned pending U.S. Patent Application.

Final Office Action of U.S. Appl. No. 10/449,171, mailing date Aug. 22, 2006, Hoang et al., Final Office Action of a commonly owned pending U.S. Patent Application.

Non-Final Office Action of U.S. Appl. No. 11/325,612, mailing date Jan. 4, 2008, Hoang et al., Non-Final Office Action of a commonly owned pending U.S. Patent Application.

Non-Final Office Action of U.S. Appl. No. 11/325,608, mailing date Jan. 17, 2008, Hoang et al., Non-Final Office Action of a commonly owned pending U.S. Patent Application.

International Search Report for PCT/US2006/062721, mailing date Feb. 14, 2008, Siperian, Inc., International Search Report of commonly owned PCT Patent Application.

Written Opinion for PCT/US2006/062721, mailing date Feb. 14, 2008, Siperian, Inc., Written Opinion of commonly owned PCT Patent Application.

International Search Report for PCT/US2007/060021, mailing date Feb. 14, 2008, Siperian, Inc., International Search Report of commonly owned PCT Patent Application.

Written Opinion for PCT/US2007/060021, mailing date Feb. 15, 2008, Siperian, Inc., Written Opinion of commonly owned PCT Patent Application.

International Search Report for PCT/US2003/017125, mailing date Sep. 11, 2003, Siperian, Inc., International Search Report of Related PCT Application.

International Search Report for PCT/US2006/025017, mailing date Jul. 31, 2007, Siperian, Inc., International Search Report of Corresponding PCT Application.

Written Opinion for PCT/US2006/025017, mailing date Jul. 31, 2007, Siperian, Inc., Written Opinion of Corresponding PCT Application.

Yan et al., Improving Prediction of Custer Behavior in Nonstationary Environments, International Joint Conference on Neural Networks, Jul. 2001, vol. 3, pp. 2258-2263.

Fung et al., Intelligent Meters for Improved System Operation and Customer Relationship Management, International Conference on Power System Technology, May 2002, vol. 3, pp. 1758-1762.

International Preliminary Report on Patentability for PCT/US06/62721, mailing date Jul. 17, 2008, Siperian, Inc., International Preliminary Report on Patentability of commonly owned PCT application PCT/US06/62721.

International Preliminary Report on Patentability for PCT/US07/60021, mailing date Jul. 17, 2008, Siperian, Inc., International Preliminary Report on Patentability of commonly owned PCT application PCT/US07/60021.

* cited by examiner

Figure 10

| 1051 | AppID 2521252 | First Name: Fred | Last Name: Doe | Addr: 111 South |
|---|---|---|---|---|

| 1053 | AppID 9822515 | First Name: F | Last Name: Doe | Addr1: 111 South | City: Chicago |
|---|---|---|---|---|---|

Figure 11

| 1151 | AppID | First Name: Fred | Last Name Doe | Addr1: 111 South |
|---|---|---|---|---|
| | 2521252 | trust score: 60.25 | trust score:66.75 | trust score: 25.51 |

| 1153 | AppID | First Name: F | Last Name: Doe | Addr1: 101 South | City: Chicago |
|---|---|---|---|---|---|
| | 9822515 | trust score: 27.25 | trust score: 35.75 | trust score: 20.32 | trust score:45.25 |

Figure 15

| App ID1 | App ID2 | First Name | Fred | Last Name | Doe | Address1 | 111 South | City | Chicago |
|---|---|---|---|---|---|---|---|---|---|
| 2521252 | 9822515 | Trust | 60.25 | Trust | 70.10 | Trust | 25.51 | Trust | 45.25 |

| AppID: 252-1250 | FirstName: Jeff | LastName: Doe | Addr1: 111 South |
|---|---|---|---|
| | Trust: 50.25 | Trust:55.75 | Trust:15.21 |

1351

| App ID: 982-2510 | First Name: J | Last Name: Doe | Addr1: 111 South | City: Chicago |
|---|---|---|---|---|
| | Trust: 17.25 | Trust: 60.10 | Trust:10.32 | Trust: 35.25 |

| App ID1 | App ID2 | First Name | Jeff | Last Name | Doe | Address1 | 111 South | City | Chicago |
|---|---|---|---|---|---|---|---|---|---|
| 252-1250 | 982-2510 | Trust | 50.25 | Trust | 60.10 | Trust | 15.51 | Trust | 35.25 |

METHOD AND APPARATUS FOR DATA INTEGRATION AND MANAGEMENT

FIELD OF THE INVENTION

The present invention relates to the field of data integration and management. In particular, the present invention discloses method and apparatus for data integration and management.

BACKGROUND OF THE INVENTION

One of the key assets an enterprise has is the data it captures about its customers and their interactions with these customers. However, enterprises have been unable to properly leverage this data because of the lack of integration into a useful format. The need for data integration includes the problems of managing data quality and reliability, and the difficulties with data reconciliation and providing a unified view for data. Unfortunately, enterprises today address the need for coherent integrated data by building an integration on a poor data foundation.

The quality, reliability, unified view, and reconciliation problems are compounded by the distributed, heterogeneous, and dynamic nature of the data capture and change process, and the requirement that data entry must be a perfect match to be integrated. In addition, most companies fail to recognize that data consolidation through a periodic one-off batch process is ineffective. New data is constantly being added or changed from multiple operational sources such as web sites, marketing, and sales force activities.

The lack of integrated data drives a variety of business problems. Marketing, sales, finance, call-center, and service agents lack a complete understanding of customer history with the business and waste time trying to figure out which customer records to use or ignore. Sales and marketing expenses balloon as duplicate, dirty or incomplete data builds up in databases as a result of redundant or misdirected marketing campaigns. Opportunities to drive new revenues or increase profitability are lost when customers and interactions are not linked. Opportunities are also lost when cross-sell and up-sell recommendations are based on generic offers or inaccurate data about an individual customer. Operational, compliance, and credit risk increases as organizations lack understanding of the entire customer relationship. The lack of current and accurate information presents a problem particularly when communication channels require an immediate reaction to a customer response or inquiry.

Enterprises have invested billions of dollars in customer relationship management (CRM) applications to improve customer retention, reduce costs, and increase profitability. Yet, despite the need for data integration, it is rarely found as an operational system in today's business environments. For instance, many companies have purchased and implemented software applications that provide a solution for a single business function, product line or touch point. However, these solutions focus on using point tools for cleansing, matching, verification, and enhancement on a batch basis to create a single data source of the truth downstream from the data capture systems. This results in systems that are managed independently and do not interact or share data well with one another. Furthermore, these applications often have very different data models and means of tracking and reporting on user interactions and transactions, leaving companies with islands of difficult-to-reconcile data. Even after several of these CRM implementations, customer data typically resides in many different enterprise application data models.

Many solutions attempt to apply tools designed for other purposes to address the need for data integration. These tools include data warehouses (DW) for analytics, or enterprise application integration (EAI) tools for integrating processes between two applications. These poor fitting attempts have fallen short of delivering complete, trusted information in an operational setting. For instance, data warehousing efforts attempt to extract select data from multiple operational databases into a single collection of meaningful information. However, this process of data aggregation results are more for historical pattern detection and is often too stale and inaccurate to be useful within operational processes. Other solutions involve storing all relevant interaction data in an operational data store (ODS), necessarily resulting in application centric one off that is expensive to maintain.

Currently, it is a challenge of the enterprise to access relevant data and turn it into actionable information at the point of customer interaction. As mentioned previously, this is primarily due to the diversity of constantly changing, heterogeneous sources for capturing operational data. Further, enterprise applications cannot execute a business rule or logic independent of application channels since most data transformation rules between applications have been written in custom code. Currently, workflows are not triggered by customer events and business rules are uncoordinated and distributed among multiple systems. Fragmented customer views combined with multiple sets of uncoordinated software-enabled rules hinder an enterprise from providing sales and service to its customers.

As described above, enterprises require "a 360° view of the customer," and need the most relevant information through existing applications. A complete view of the customer requires an ability to act in real time and to gather data from all applications and touch points. Previous approaches to fixing customer data quality and management problems have only focused on part of the data integration issue. These solutions do not meet the basic need of businesses for real time integration and management of high value (reliable) data. Thus, simultaneously leveraging all of the available data to obtain an up-to-date comprehensive view of any customer remains a significant data integration challenge for the enterprise.

Thus, there is a need in the art for a system that integrates data to create and maintain the best version of truth for that data and delivers that data to real-time operational setting, and across multiple data sources.

SUMMARY OF THE INVENTION

A system for maintaining master reference data for entities is disclosed. The system includes multiple reference data sets at multiple different data storages. A reference data set for a particular entity uniquely identifies the particular entity. The system also includes a first master reference data set at a first data storage that is at least as reliable as a second reference data set at a second data storage. In some embodiments, the first data storage can be updated through real-time process or an offline process (e.g., a batch process).

The first master reference data set includes at least one data record, and content metadata regarding the data record. In some embodiments, content metadata comprises lineage data that includes each preceding value that was contained in the data record. In some of these embodiments, lineage includes other factors that affected the present and previous values contained in the data record. The lineage of data could affect the reliability of the first master reference data set. As further described below, content metadata in some embodiments also includes other types of data such as history, validation results, trust parameters, etc.

Some embodiments provide a system for maintaining master reference data for entities. The system includes several data storages for storing several reference data sets, where each reference data set identifies a particular entity, and each of several entities has a several reference data sets stored in several data storages. One of the data storages is a master reference data storage that stores a master reference data set for each of several entities. A master reference data set for a particular entity is the most reliable reference data set stored for the particular entity in any of the data storages. The system also includes a master reference manager for receiving reference data sets in real time, modifying at least one master reference data set in real time based on a received reference data set, and maintaining content metadata for at least one master reference data.

In some embodiments, the master reference manager includes a trust framework for updating master reference data sets in real time. In some embodiments, the trust framework includes a trust score calculator and a set of configurable rules by which the trust score calculator calculates the trustworthiness of a particular data value. These rules may include: (1) rules specifying the trustworthiness of a particular field in a particular data set, (2) rules specifying how the trustworthiness of a paticular value changes over time based on the date and time the value was changed, and (3) business rules that specify how the trustworthiness of a value is modified based on formulas used to validate a particular type of data (e.g., a 6-digit phone number might have a lower trust than a 10-digit phone number).

BRIEF DESCRIPTION OF THE DRAWINGS

The novel features of the invention are set forth in the appended claims. However, for purpose of explanation, several embodiments of the invention are set forth in the following figures.

FIGS. 10-11 show the scoring of two reference data records by the trust score calculator.

FIG. 13 illustrates an example of trust scoring for the two records.

FIG. 14 illustrates an exemplary master record that contains merged data from the two matching data records shown in FIG. 13.

FIG. 15 illustrates an example of a merge operation.

DETAILED DESCRIPTION OF THE INVENTION

The invention is directed towards method and apparatus for data integration and management. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
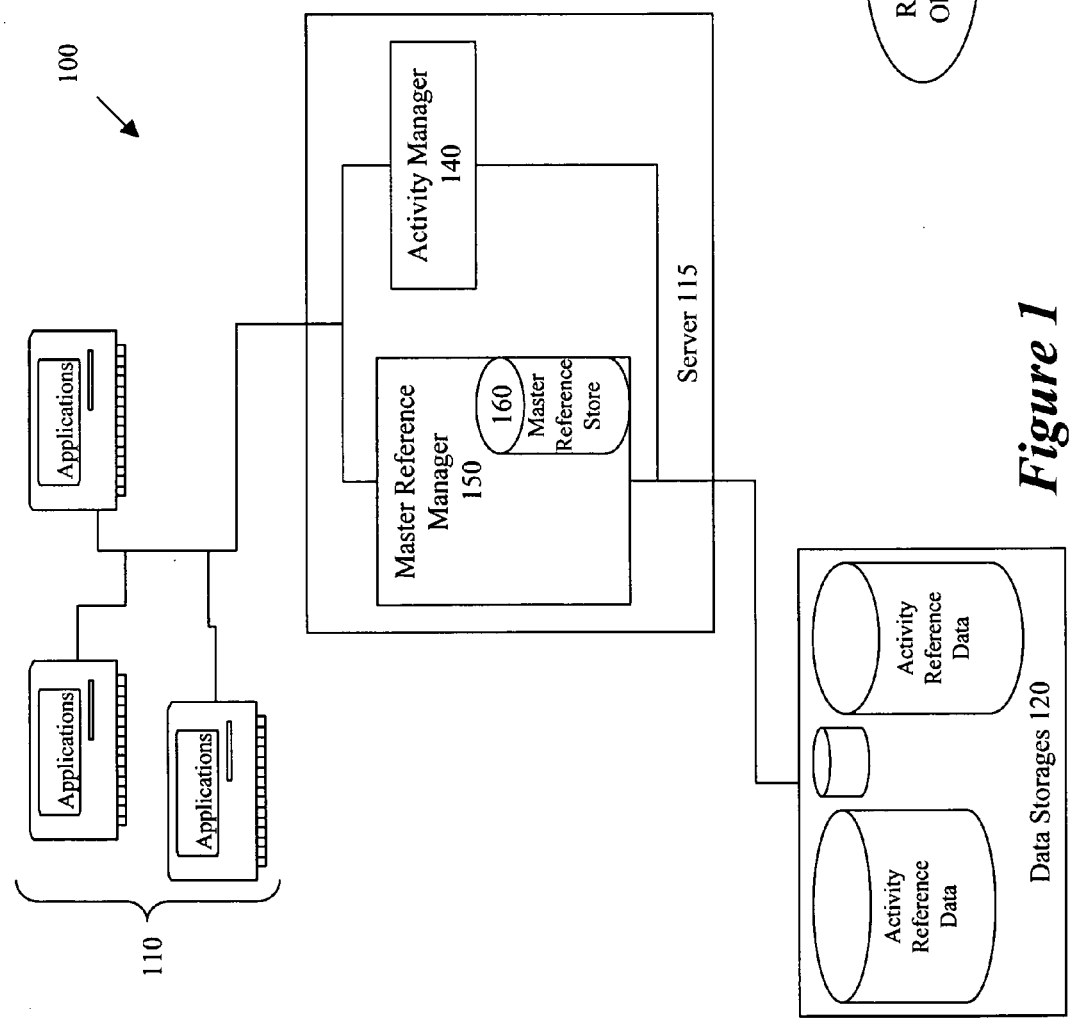
FIG. 1 illustrates a system that implements data integration operations according to some embodiments of the invention.

FIG. 1 illustrates a system 100 that implements data integration operations according to some embodiments of the invention. An enterprise can use this system to maintain records regarding its interactions with other entities, e.g., its customers, vendors, products, etc. As shown in this figure, the system 100 includes (1) one or more applications 110, (2) one or more servers 115, (3) one or more data storages 120, and (4) a master reference manager 150 and an activity manager 140 that run on the server 115.

The data storages 120 store (1) data that identifies the entities that the system tracks for the enterprise, and/or (2) data that specifies the interaction of these entities with the enterprise. The data that identifies the entities is referred to as reference data, while the data that specifies the interactions and transactions with the entities is referred to as activity data.

The data storages 120 might store multiple reference data records for a particular entity. This redundant data may cause problems for an enterprise that uses the data. For instance, the redundant data may contain inconsistencies or overlaps that need to be resolved to ensure the reliability of the data. Therefore, the system 100 also stores a "best version" of the reference data record for at least some of the entities. Specifically, the master reference manager 150 stores and maintains these best versions in a master reference store 160. For instance, according to some embodiments of the invention, the master reference manager 150 updates in real time the reference data records in the master reference store 160 to reflect any changes to the reference data records in the data storages 120. In addition, the master reference manager 150 can also update these records through other processes, e.g., batch processes, etc. These real-time and scheduled updating processes will be further described below by reference to FIGS. 6-7.

Figure 2:
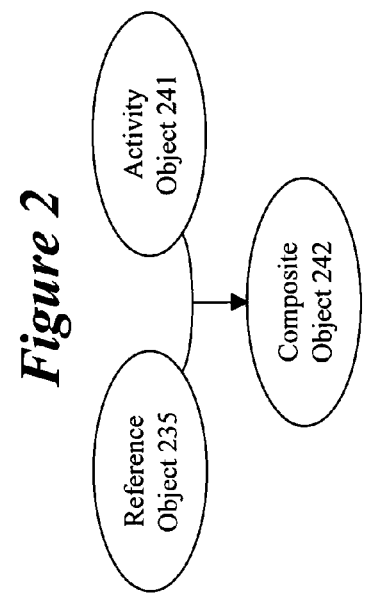
FIG. 2 illustrates a composite data object used by some embodiments of the invention.

The activity manager 140 uses the reference data records whenever an application initiates a particular interaction with the enterprise regarding a particular entity. In such a situation, the activity manager 140 is responsible for providing a composite data object to the particular application, in order to allow the particular application to use activity data regarding the particular interaction. As shown in FIG. 2, the composite data object 242 includes in some embodiments (1) a reference data object 235 and (2) an activity data object 241. The reference data object 235 is provided to the activity manager 140 from the master reference manager 150. This object is an instantiation of all or part of the master reference record stored in the master reference store 160 for the particular entity.

The activity data object 241, on the other hand, is a data object that the activity manager 140 manages. The particular application then uses transaction data regarding the particular interaction in the activity data object 241 of the composite data object 242 that it receives from the activity manager 140. After using the transaction data, the application then might temporarily or permanently store the composite data object 142, or data extracted from this object, in one or more of the data storages 120. The application might temporarily or permanently store this composite data object, or data extracted from this object, directly into the data storage, or indirectly through another module or application (e.g., indirectly through the activity manager 140).

One of ordinary skill will recognize that variations may occur in the arrangement of system 100. For instance, the activity manager 140 and the master reference manager 150 are drawn in parallel on the same layer in FIG. 1 for purposes of representation. In other embodiments, activity manager 150 can reside on top of master reference manager 150 as a separate module or even be partially implemented in the same module. Specific embodiments of activity manager 140 are described in further detail in U.S. Patent Application US2004/0006506 A1 published Jan. 8, 2004.

In the discussion below, Section I provides several examples of reference data and reconciliation of such data to produce best versions of reference data. Section II then describes the master reference manager of some embodiments of the invention. Section III describes a trust framework used by the master reference manager of some embodiments.

I. Examples of Reference Data and Data Consolidation

Figure 3:
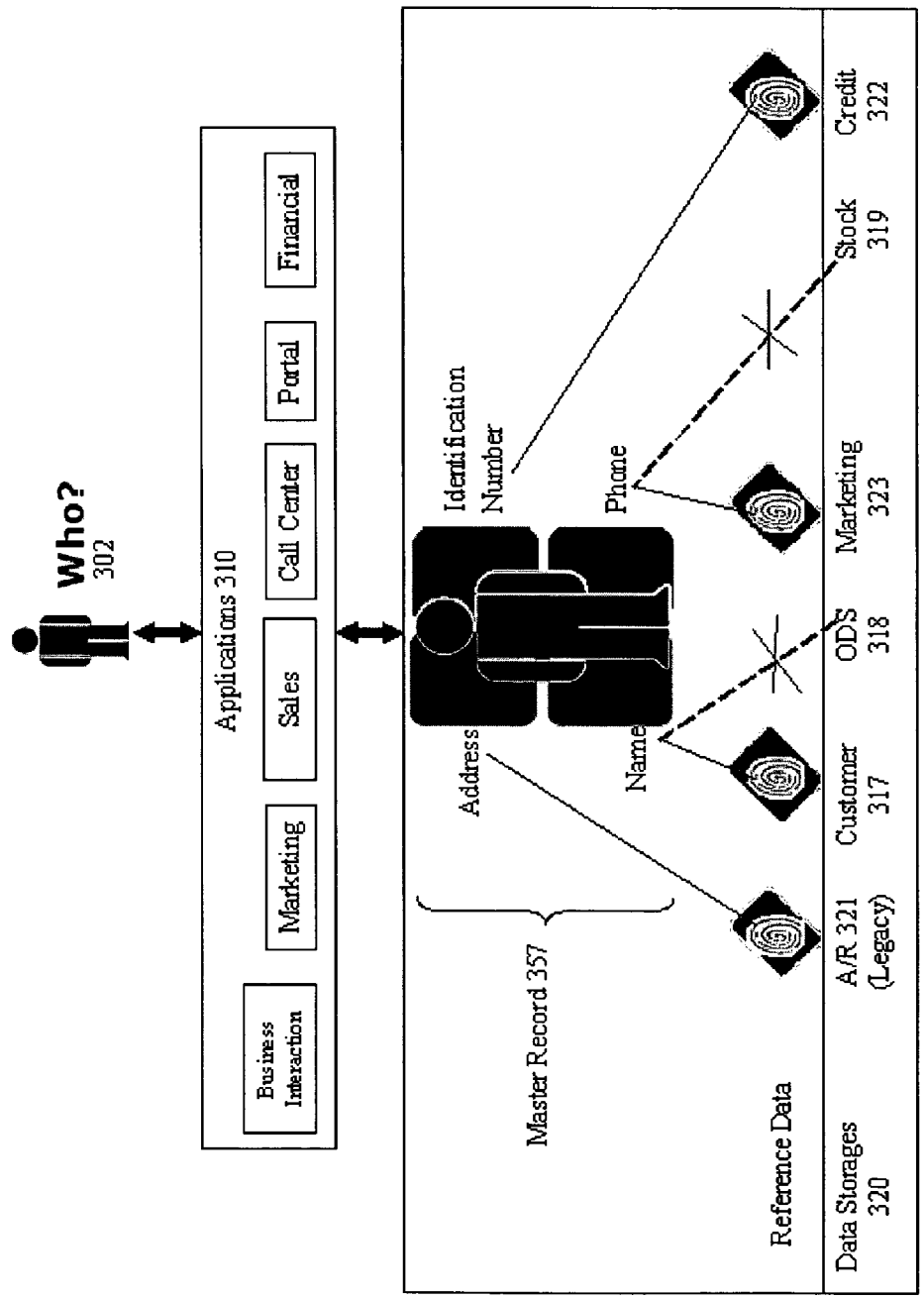
FIG. 3 provides one example that illustrates storing reference data attributes in multiple different data storages.

Multiple instances of reference data attributes for an entity might be stored in one data storage or in multiple different data storages. FIG. 3 provides one example that illustrates storing reference data attributes in multiple different data storages. Specifically, this figure illustrates an entity 302, several applications 310 for interfacing with the entity, a master record 357 for the entity, and several data storages 320.

In this example, multiple reference data attributes of the entity are stored in the data storages 320. In particular, FIG. 3 illustrates (1) the accounts receivable (A/R) 321 data storage storing the address of the entity 302, (2) the credit 322 data storage storing the identification (ID) number (tax ID, social security number, etc.) of the entity 302, (3) the customer data storage 317 and operational data storage (ODS) 318 storing the name of the entity 302, and (4) the marketing data storage 323 and stock data storage 319 storing the telephone number of the entity 302.

As mentioned above, FIG. 3 also illustrates a master record 357 for the entity 302. This master record represents the best version of reference data attributes for the entity 302 from multiple instances of this data. For instance, FIG. 3 shows the entity's name stored in the customer data storage 317 and ODS 318, and the entity's telephone number stored in the marketing data storage 323 and the stock data storage 319. However, as shown in FIG. 3, the name and telephone attributes of the master record 357 are each selected from only one of the data storages (i.e., the entity's name is selected from the customer 317 data storage, but not from the ODS 318, while the entity's telephone number is selected from the marketing data storage 323, but not from the stock data storage 319).

Figure 4:
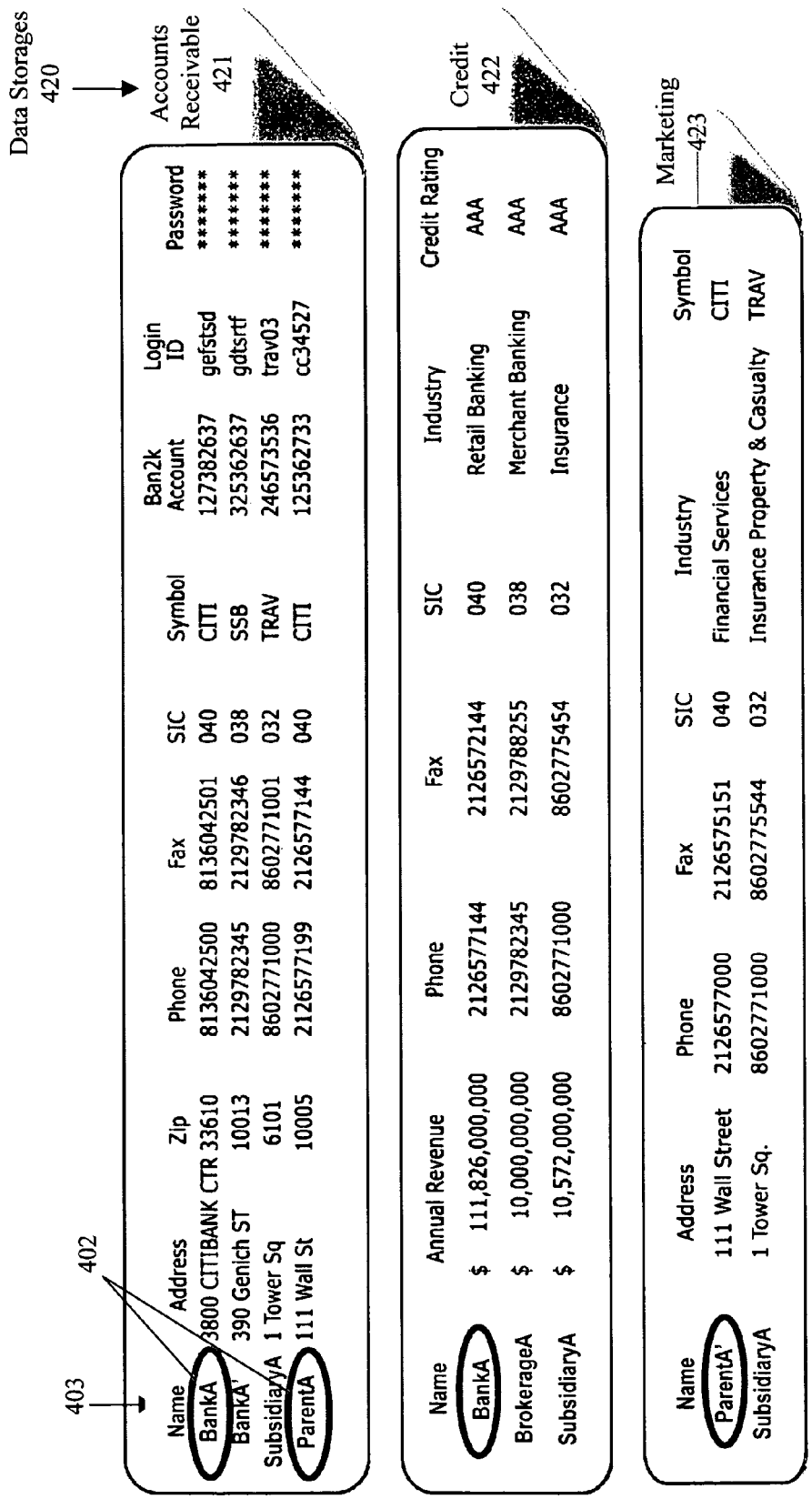
FIG. 4 illustrates another view of the example presented in FIG. 3.

FIG. 4 illustrates another view of the example presented in FIG. 3. In this view, the entity 402 is identified as BankA. As shown in FIG. 4, the data storages 420 have multiple records regarding BankA. In fact, the A/R 421 data storage itself has multiple records regarding BankA. As shown in FIG. 4, the name of BankA is slightly different in some of the records in the data storages 420. For instance, if the BankA is Citicorp, its name might be specified in different records as Citibank, Citi, Citigroup, Salomon, or even Travelers.

To determine the best version of the entity's data, some embodiments identify multiple instances of the entity's data both within and across multiple data storages. Once multiple instances of the entity's data have been identified both within and across multiple data storages, some embodiments apply cell-wise deterministic selection of the best data to form a master record for the entity.

Figure 5:
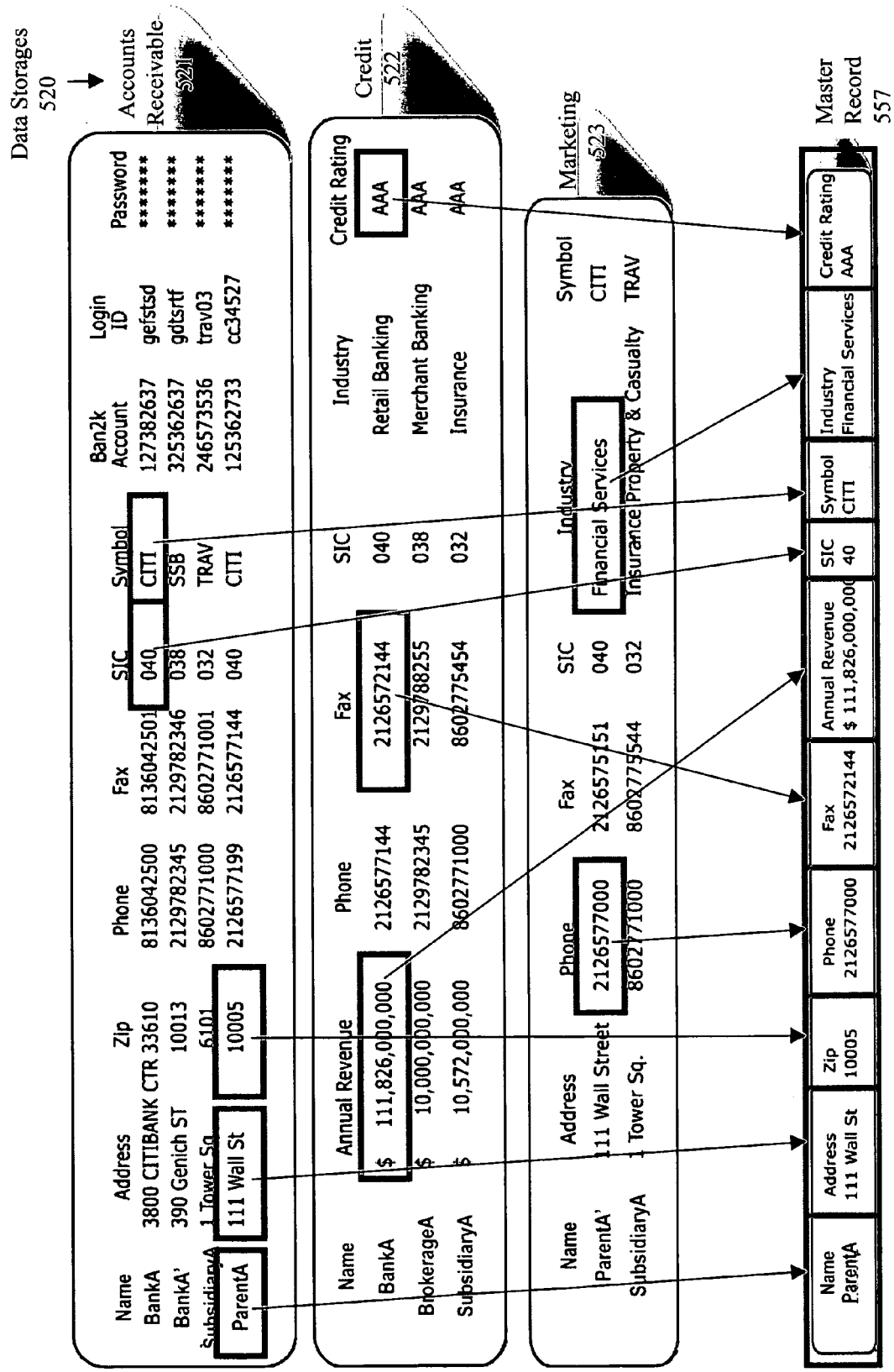
FIG. 5 illustrates an example of performing cell-wise deterministic creation of a master record.

For the reference data records illustrated in FIG. 4, FIG. 5 illustrates an example of performing cell-wise deterministic creation of a master record 557. As shown in FIG. 5, the master record 557 is defined by selecting different reference data attributes from different reference data records in the data storages A/R 521, credit 522, and marketing 523. Specifically, the FIG. 5 illustrates the insertion into the master record 557 of (1) the name, address, zip code, SIC, and stock symbol from the A/R data storage 521, (2) the annual revenue, fax, and credit rating from the credit data storage 522, and (3) the telephone and industry from the marketing data storage 523. However, the master record 557 might contain additional data other than reference data (e.g., derived and interaction or activity data).

II. The Master Reference Manager and Trust Framework

Figure 6:
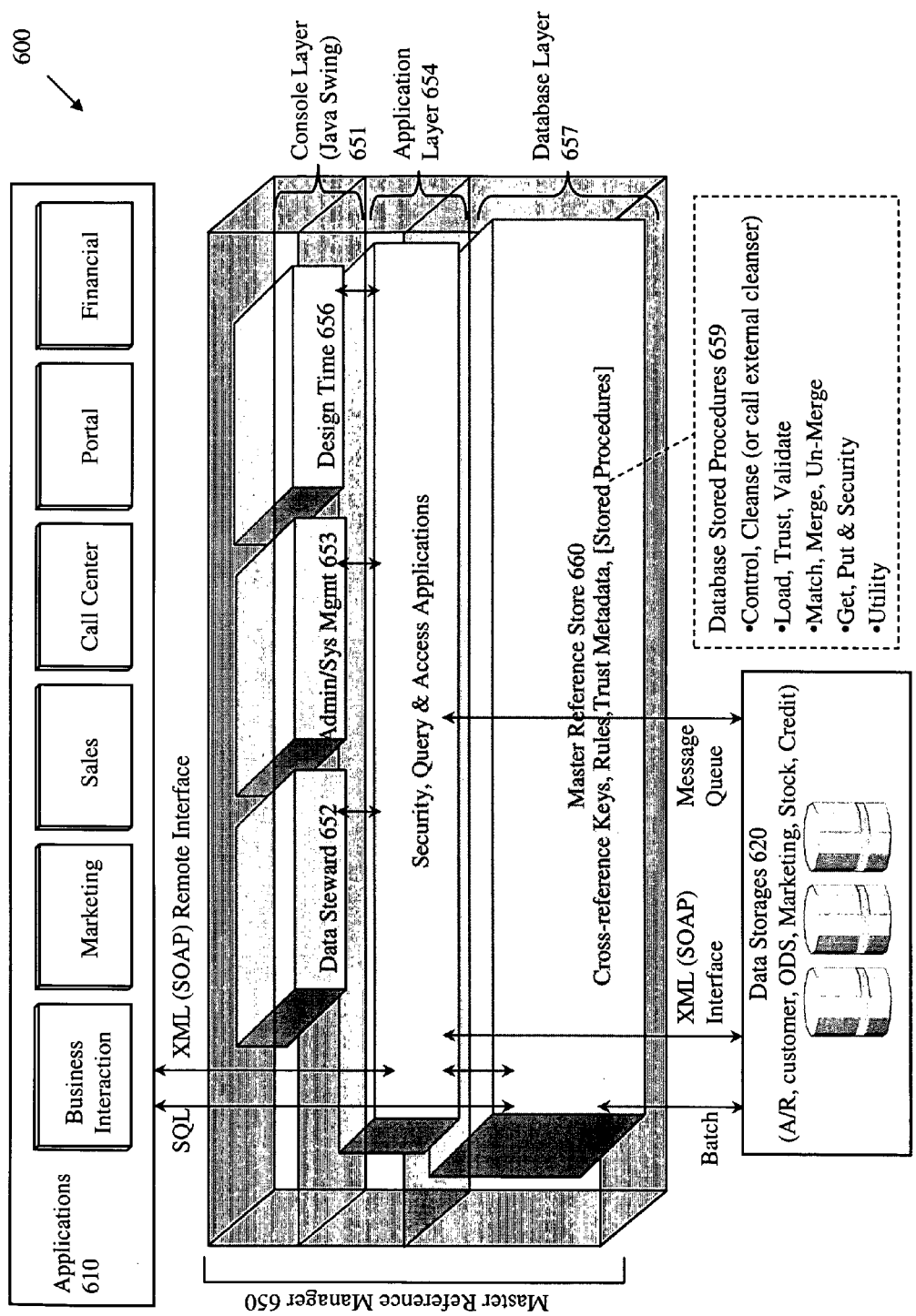
FIG. 6 shows the master reference manager of some embodiments of the invention.

FIG. 6 shows the master reference manager 650 in further detail. As shown in FIG. 6, the master reference manager 650 interacts with applications 610 and data storages 620. Master reference manager 650 includes a console layer 651, an application layer 654, and a database layer 655.

The console layer 651 includes a design time console 656, an administration and system management console 653, and a data steward console 652. These consoles each provide access to tools for configuration, system administration, and maintenance of the master reference manager 650. Typically, a design team configures the master reference manager 650 at implementation by using the design time console 656. A system administrator further configures the master reference manager 650 during setup (of users, accounts, passwords, security, etc.) by using the administration and system management console 653. A data steward maintains the data and the master reference manager 650 on an ongoing basis by using the data steward console 652. For instance, the console layer 651 provides a data steward tool that may be used by an enterprise data steward to maintain the reference data. Some embodiments allow the data steward to adjust such parameters as data reliability decay algorithms, or to manually merge and unmerge data. Thus, the console layer 651 interfaces with the application layer 654 and the database layer 657 to effect these configurations upon the operations of the master reference manager 650.

The application server layer 654 provides a layer for the master reference manager 650 to execute applications and stored procedures. Such applications and procedures can relate to security, access, administration of the master reference manager 650, and to a trust framework (in the database layer) for data integration and maintenance. The application layer 654 interfaces with the database layer 657 to access stored information required for the execution of applications and procedures.

The database layer 657 includes the master reference store 660. As mentioned above, the master reference manager 650 uses the master reference store 660 to integrate and maintain master reference data. The master reference store 660 also stores other types of data (e.g., derived and interaction/activity data). The master reference store 660, in some embodiments, further stores procedures and other additional data that the master reference manager 650 uses to perform data integration and maintenance. Specifically, the application layer 654 calls the stored procedures 659 and uses the additional data to find and maintain the best version of truth for reference data in the system 600. Procedures 659 comprise, for instance, parse, cleanse, load, trust, validate, match, merge, get, put, security, and utility procedures. Such additional data includes cross-reference keys, rules, and trust metadata as part of a trust framework. The trust framework will be further described later. Such procedures may execute within the master reference manager 650 and/or may call functions that operate external to the master reference manager 650. For instance, a cleanse procedure may perform a function call to a cleanser module (not shown) that is external to the master reference manager 650.

As shown in FIG. 6, each layer of the master reference manager 650 communicates with the applications 610 and the data storages 620 through a variety of real time and batch/scheduled pathway processes. For instance, the application layer 654 can communicate with the applications 610, the data storages 620, and the database layer 655 by using an extensible markup language (XML) or a simple object access protocol (SOAP) process. This XML/SOAP process typically operates in real time. The application layer 654 may also communicate with the data storages 620 through a message queue process, which may also operate in real time. In some embodiments, the database layer 155 communicates by using processes known in the art. For instance, the applications and the data storages can communicate with the database layer through a batch/scheduled process or a Sequel (SQL) process.

Figure 7:
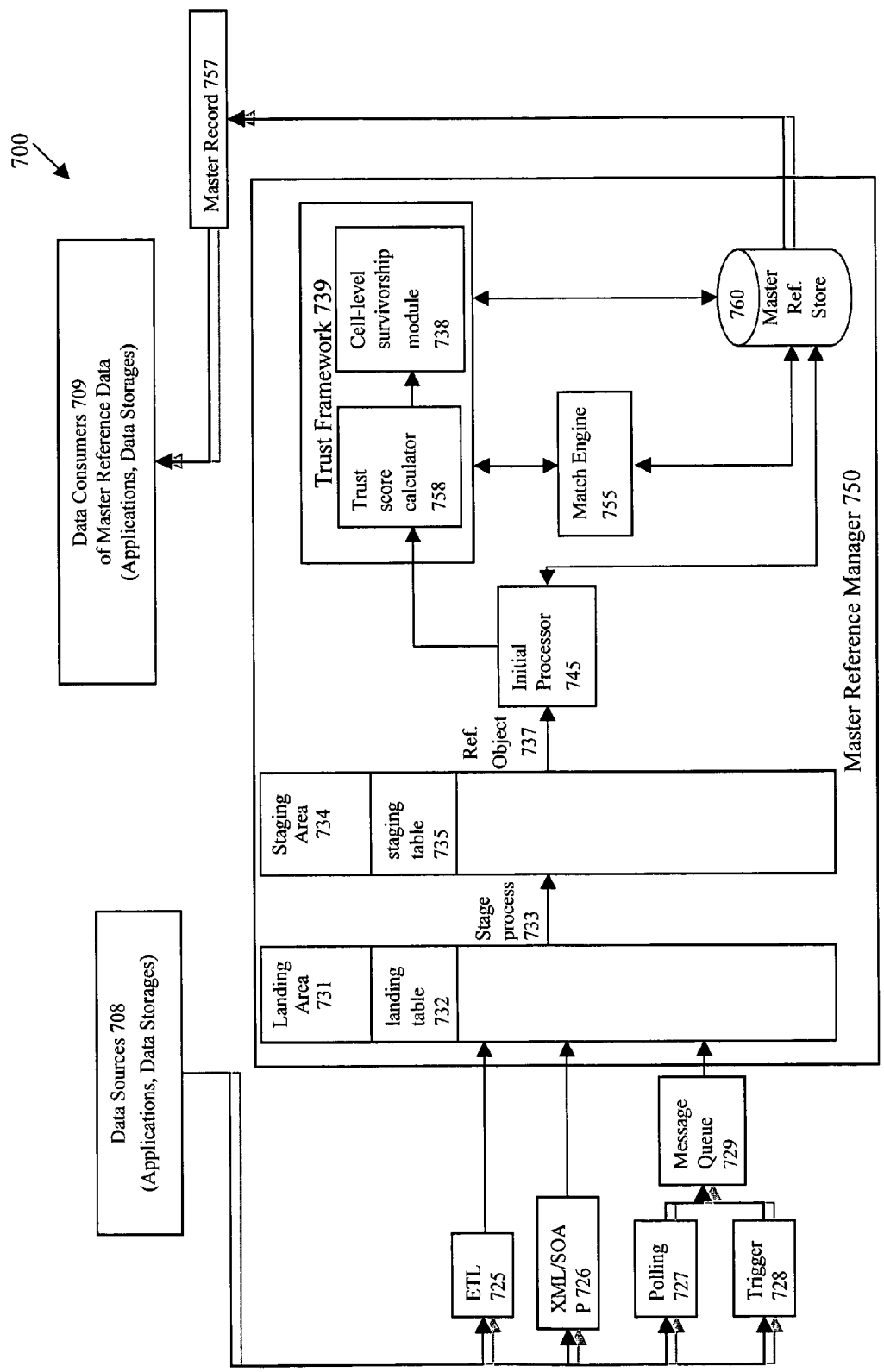
FIG. 7 illustrates a data flow for a system according to some embodiments of the invention.

These various communication pathway processes are described in further detail by reference to FIG. 7. FIG. 7 illustrates a data flow for a system 700 according to some embodiments of the invention. System 700 includes the master reference manager 750, data sources 708, and data consumers 709. The master reference manager 750 also includes a landing area 731, a staging area 734, and a trust framework 739.

In some embodiments, the data sources 708 include applications and data storages, such as the applications 110 and data storages 120 of FIG. 1. Similarly, in some embodiments, the data consumers 709 include applications (e.g., applications 110) and data storages (e.g., data storages 120). In some cases, the data sources 708 and the data consumers 709 may overlap such that a source of data is also a consumer of data (e.g., the case of data updating or writeback).

As shown in FIG. 7, the reference data from each of the data sources 708 enters the master reference manager 750 through a variety of pathway processes. For instance, data from a data source 708 (such as a file) can enter the master reference manager 750 through an extract-transform-load (ETL) process 725, which can be a typical batch or scheduled process. Data from a data source 708 can also enter the master reference manager 750 through an XML/SOAP process 726. For instance, an application data source 708 can generate directly an XML/SOAP process 726 to deliver data to the master reference manager 750 in real time.

As further shown in FIG. 7, the data sources 708 can also be polled by a polling process 727 for changes to the data in the data sources 708. For instance, the polling process 727 may poll a data storage in the data sources 708. The polling process 727 then generates a message regarding a data change to a message queue 729, when the polling process 727 discovers such a change in the data storage 708. Alternatively, in other embodiments, the data storage can directly generate a message regarding a change in data to a trigger process 728, when such a data change occurs in the data sources 708. The trigger process 728 may generate a message regarding the change in data to the message queue 729. The message queue 729 then delivers the queued messages to the master reference manager 750. In these various embodiments, the messages to and from the message queue 729 can also use the XML format or another format that permits operation in real time.

Irrespective of whether the ETL process 725, XML/SOAP process 726, or the message queue 729 is used to retrieve data from the data sources 708, data first enters the master reference manager 750 through the landing area 731, as shown in FIG. 7. At the landing area 731, the received data is used to construct a landing table 732. Data in the landing table 732 typically reflects the data structure used by the data sources 708.

As further shown in FIG. 7, a staging process 733 constructs in the staging area 734 a staging table 735 by using a stage process 733. The stage process 733 can include delta detection and data cleansing. In some embodiments, delta detection initially confirms whether the received data has actually been changed or is different from previously received data. Delta detection may reduce unnecessary processing of unchanged data. In some embodiments, data cleansing performs a standardization operation that normalizes data for processing and storage by the master reference manager 750. In other words, the cleansed data that is stored in the staging table 735 is in a format that can be processed by the trust framework 739. In some embodiments, this format is the same format that is used to store reference data in the master reference store 760.

Figure 8:
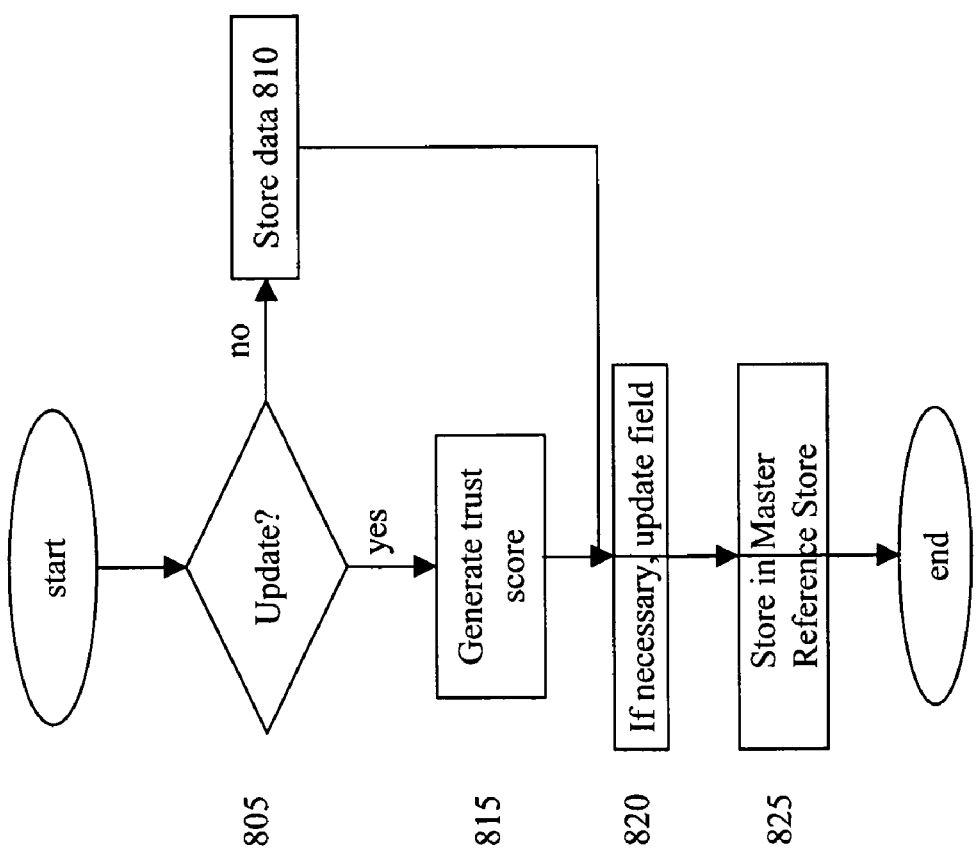
FIG. 8 illustrates an update process performed by the master reference manager.

After reference data records are cleansed and staged at the staging area 734, the master reference manager 750 performs an update process 800 that is illustrated in FIG. 8. The update process 800 is performed by an initial processor 745 and a trust framework 739 of the master reference manager 750.

As shown in FIGS. 7 and 8, the initial processor 745 initially determines (at step 805 of the update process 800) whether the reference data (e.g., reference object 737) entering the initial processor 745 updates a reference data record stored in the master reference store 760. In some embodiments, an update is a modification to data in a cell of a reference data record. In some of these embodiments, the initial processor 745 uses cross-reference keys associated with the received data record to determine whether the data record is an update or updates data previously stored in the master reference store 760. In these embodiments, the initial processor 745 searches the master reference store 760 to check whether master reference records in the master reference store 760 also have a record with the same set of associated cross-reference keys. The presence of the associated cross-reference keys in the master reference store 760 indicates that the data entering the master reference manager 750 is an update.

When the initial processor 745 determines (at 805) that the data is not an update (i.e., new data), then the initial processor 745 stores (at 810) the data in the master reference store 760 without further processing. When the initial processor 745 determines that the data is an update, then the trust framework 739 retrieves the update data from the initial processor 745 to perform trust calculations and cell level functions on the update data. Then the trust framework 739 consolidates the update data with stored data in the master reference store 760.

In some embodiments, the trust framework 739 applies a concept of "trust" to update master records. The concept of trust involves a system of measuring the value and reliability of data. Trust may be represented as a numerical score as to the confidence of the system in that data. Trust scoring may be based upon a system of rules. For instance, trust may be affected by the recency of data or by the confidence in the data source. Trust may also involve deterministically selecting data values from among a set of data values based upon the measures of trust (i.e., based upon the trust score).

FIG. 7 conceptually illustrates the trust framework 739 to include two modules, a trust score calculator 758 and a cell level survivorship module 738. In some embodiments, the trust framework 739 applies these two modules to perform data consolidation during the updating process 800 shown in FIG. 8. At step 815 in the update process 800, the trust framework 739 generates trust scores by using the trust score calculator 758. The trust score calculator 758 computes trust scores for some or all of the fields in a reference data record. This trust score calculator 758 computes the trust score differently in different embodiments.

In some embodiments, the trust score calculator 758 computes the trust score based on certain parameters, algorithms, and rules. One example of such parameters are source reliability weighting parameters that specify the reliability of the data source and fields from which the reference data records are provided. One example of trust rules are syntax validation rules that are used to determine the trust score of a data field based on the value of the data that is stored in that field. For instance, a syntax rule might reduce the trust score of a telephone number when the telephone number is not seven or ten digits long.

Figure 9:
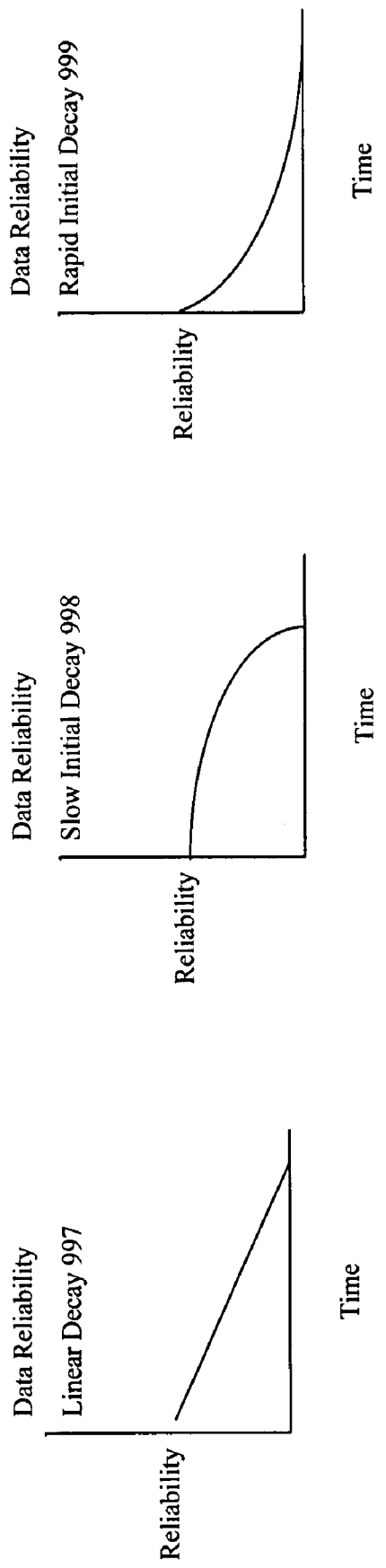
FIG. 9 illustrates three examples of data decay profiles that can be used by such data decay algorithms.

Examples of algorithms in the trust framework 739 include data decay algorithms that express the diminishing value of data over time. FIG. 9 illustrates three examples of data decay profiles that can be used by such data decay algorithms. Such three data decay profiles include: (1) a linear reliability decay function 997, (2) a slow initial reliability decay function 998, and (3) a rapid initial reliability decay function 999. In some embodiments, the trust framework 739 applies one of these three data reliability decay functions to the data entering the trust framework 739 to determine the reliability of the data at a point in time. For instance, the rapid initial reliability decay function 999 can be used to represent data that is expected to change frequently and thus become unreliable within a relatively short passage of time. This data would be expected to have an initial trust score that rapidly diminishes until its reliability (i.e., trust score) plateaus at a lower state. This feature, as represented by the rapid initial reliability decay function 999, can be attributed to data during scoring. As previously described by reference to FIG. 6, some embodiments administer data reliability decay functions and applicability to various types of data by using a data steward tool.

Thus, the trust framework 739 includes a rule-based system of trust that includes various algorithms and parameters. The trust score calculator 758, in the embodiments described above, applies the system of trust to compute trust scores for data entering trust framework 739. FIGS. 10-11 show the scoring of two reference data records by the trust score calculator 758. Trust scoring begins when one or more records are received by the trust framework 739 from the initial processor 745. In some embodiments, these records are cleansed records received by the initial processor 745 from a staging table. In some embodiments, these records also include stored records retrieved by the initial processor 745 from the master reference store 760 based on associated cross-reference keys.

FIG. 10 illustrates two such records 1051 and 1053 received by the trust framework 739. In the example illustrated in FIG. 10, the received record 1051 was received by the initial processor 745 and has undergone delta detection and cleansing. By using the cross-reference keys associated with the received record 1051, the initial processor has determined that the received record 1051 updates a stored record 1053 in the master reference store 760. The initial processor 745 retrieves the stored record 1053 from the master reference store 760 based on the associated cross-reference keys from the received record 751.

At step 815 in FIG. 8, the trust score calculator 758 calculates trust scores for each field of the records received by the trust framework 739 (e.g., records 1151 and record 1153 in FIG. 11). The trust framework 739 may initially determine whether each field of the records 1051 and 1053 is trusted or not trusted. In some embodiments, some fields may already have trust scores calculated that may be used by the trust framework 739. In other embodiments, the trust framework 739 calculates trust scores for each and every field regardless of any pre-existing calculations.

FIG. 11 illustrates a trust score computed for each field of the two data records to yield scored records 1151 and 1153. As mentioned above, the trust score is calculated by the application of certain rules to the fields and sources of the reference data records, and based on the attributes of these fields and sources. For instance, some sources may be deemed more reliable than others, thus data from these sources will be weighted or ranked more highly in terms of trust. Similarly, data from a field that has been updated recently may be given a greater trust weighting than data that has remained unchanged for a longer period of time. Thus, in some embodiments, trust scoring can be a combination of these weighted measures.

Data Consolidation by Updating

As shown in FIG. 11, one scored record 1153 contains more information (i.e., the "City" field) than the other scored record 1151. However, the scored record 1151 with less data has higher scored data in all other fields, which may indicate a higher probability of reliability for these fields in this scored record 1151. Once the trust score calculator 758 computes one or more trust scores for a reference data record (at step 815 in FIG. 8), the trust framework 739 then updates the fields of the data based on the trust scores, at step 820 of the update process 800. The cell level survivorship module 738, if appropriate, consolidates the cells of the data record with cells from data records containing redundant or conflicting information. Some embodiments will select the fields from the higher scoring record 1151, and will also select the City field for inclusion in a consolidated master reference record. In these embodiments, the consolidated record will thus contain the best available reference data from these records 1151 and 1152.

Here, the trust framework 739 may also apply cell-level survivorship to the data by using the cell-level survivorship module 738. The cell level survivorship module 738 of some embodiments maintains content metadata for each data field that is updated. Two examples of content metadata are (1) the lineage of the new value and the source that provides this new value, and (2) the history of the replaced value and the source that provided the replaced value. Some embodiments maintain the full lineage and history for the replaced data fields and the data sources from which these fields emanated. Maintaining history and lineage for each field allows some embodiments to provide for an un-merge procedure. History, lineage, and un-merge will be described in further detail later by reference to FIG. 16. Other examples of content metadata are also described further below.

At step 825, the trust framework 739 stores the scored and/or consolidated updates in the master reference store 760. The data in the master reference store 760 (e.g., master reference record 757) is available to the data consumers 709. Thus, the master reference manager 750 of some embodiments maintains (e.g., updates and consolidates) the reference data by using a variety of functions and features including the rules-based system of the trust framework 739. As mentioned above, these scored records are consolidated during updating and then stored in the master reference store 760 where they await additional updating by a data source, retrieval by a data consumer, and/or matching by a match engine. The match engine will be described further in the next section.

III. Match Engine

Once reference data is stored in the master reference store 760, some embodiments further consolidate the stored data through a match and merge process. Such consolidation includes, for instance, removal of redundant records and resolution of conflicting records. To further consolidate master records stored in the master reference store 760, the master reference manager 750 includes a match engine 755. The match engine 755 may operate periodically or in real time to consolidate master records in the master reference store 760. The operation of the match engine 755 could be triggered by various events such as a change in a master data record stored in the master reference store 760. The match engine 755 may also be triggered by a change in the rules and trust algorithms relating to the trust scoring of the master data records. The data steward may further trigger the match engine 755 to specifically perform matching at various times.

When scheduled or requested, the match engine 755 determines whether a data record matches one or more data records stored in the master reference store 760. To match existing records in the master reference store 760, the match engine 755 of some embodiments may use a method different from the system of cross reference keys described above in relation to updating by the initial processor 745.

Figure 12:
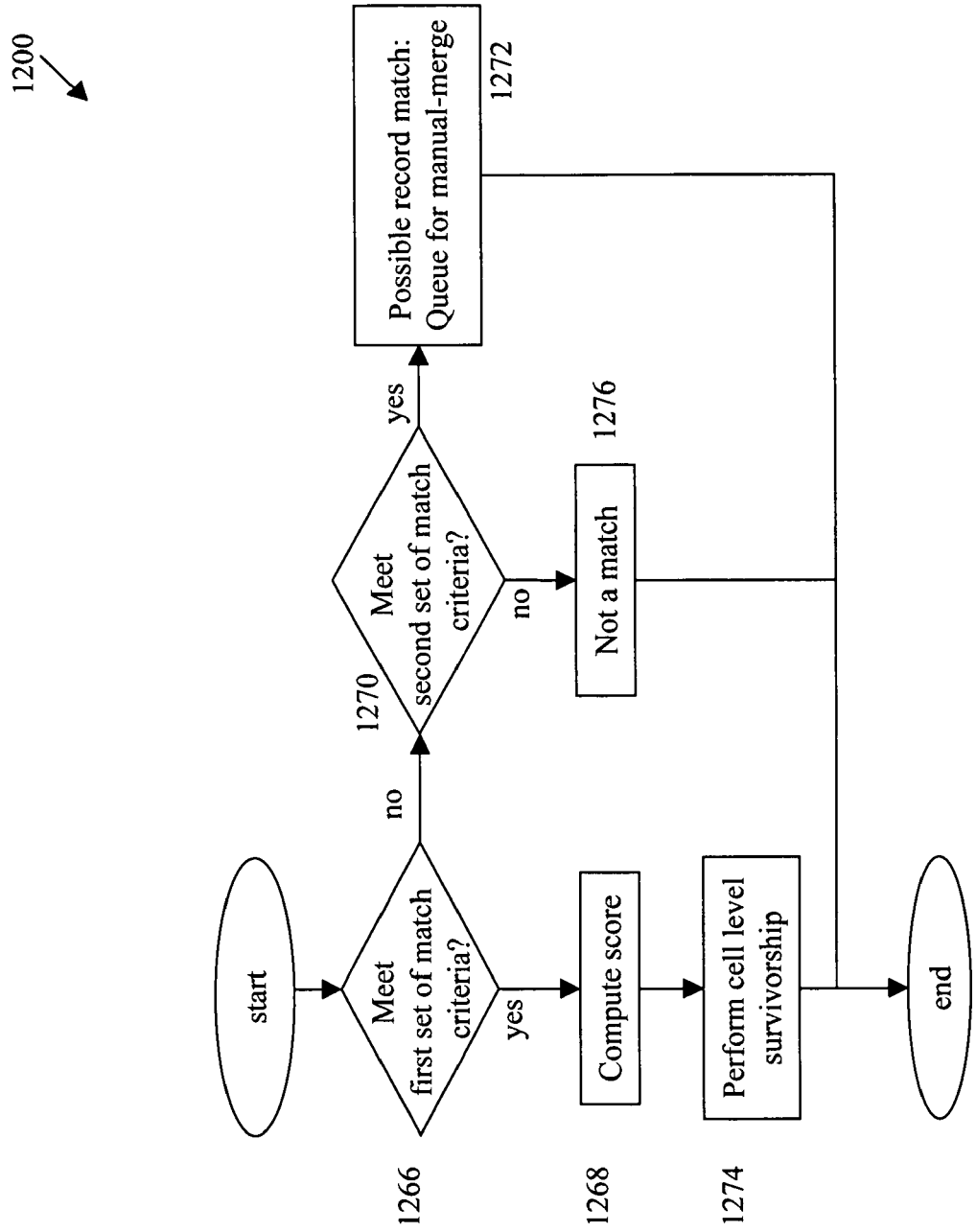
FIG. 12 illustrates a match-and-merge process that is employed by some embodiments.

FIG. 12 illustrates a match-and-merge process 1200 that is employed by some embodiments. The match process 1200 begins at step 1266 in FIG. 12, where the match engine 755 determines whether a first set of criteria are met based on the records. In some embodiments, the first set of criteria includes whether a set of X fields match between the records. To perform this determination, the matching engine of some embodiments uses SSA-NAME3 from Identity Systems, an Intellisync Company.

If the process 1200 determines (at step 1266) that the first set of criteria are not met (e.g., the set of X fields do not match), then the match engine 755 may determine whether a second set of criteria are met (e.g., a different set of Z fields match) at step 1270. For this operation, the matching engine of some embodiments can again use the matching modules SSA-NAME3 from Identity Systems, an Intellisync Company. The second matching determination at 1270 allows the match engine 755 to differentiate between both the number and the quality of field matches at steps 1266 and 1270. For instance, in the case where the first set of criteria comprises a set of X field matches, the set of X fields at step 1266 might include both a high threshold number of field matches and some particular fields that are a strong indicator of a match (e.g., the first name, last name, and address fields all match, or just the first name and address fields match). This case may represent a correct match between the records for almost every instance where the set of X fields match, and thus meeting this condition indicates a highly probable or "absolute" match.

On the other hand, the second set of criteria for the set of Z fields at step 1270 can include a lesser number and a lesser quality of field matches (e.g., only the last name and address fields match). If only the set of Z fields match, then there is only a possibility of a record match in this instance and this "possible" match should be queued for an individual to inspect the data and/or perform a manual-merge at step 1272.

The inspection and manual-merge at step 1272 are typically performed by an individual with access and authority to determine matches between records. This person is typically an enterprise data steward. If a manual-merge is appropriate at step 1272, then the data steward or other individual may manually merge the records into the master record. If the individual at step 1272 determines that the records should not be merged, then the records are likely not a match and the match process 1200 concludes after step 1272. Also, if the set of Z fields did not match at step 1270, then there is not a match and the match process 1200 concludes after step 1276.

If, at step 1266, a sufficient number and/or quality of fields match, then there is a highly probable (i.e., virtually absolute) record match and the reference records enter/re-enter the trust framework 739 at the trust score calculator 758. When records match, the data contained in the records typically require processing in the trust framework 739 (e.g., merging) to ameliorate the stored data, resolve redundancies and/or conflicts, and adjust trust. This often requires calculation of trust scores and application of cell level survivability for the merged records.

As mentioned above, the trust framework 739 of some embodiments is integral in performing data consolidation functions (e.g., trust scoring and cell level survivability) during updating. The operation of the trust framework 739 and the trust score calculator 758 were discussed previously in relation to updates and new data. However, some embodiments also employ the trust framework 739 for data consolidation during a match and merge process. For data consolidation during a match and merge process, the operation of the trust framework 739 is as previously described, except that at step 1268 of the match process 1200, the trust score calculator 739 calculates trust scores for the records. FIG. 13 illustrates an example of trust scoring for the two records 1351 and 1353. As shown in FIG. 13, each field of the records 1351 and 1353, has an associated trust score.

Data Consolidation by Match and Merge

Next at step 1274, the trust framework 739 may merge several records into a master reference record that is the best version of this data. When the match engine 755 identifies records that match and should be merged during the steps 1264-1274 of the match process 1200, the trust framework 739 of some embodiments is employed to perform the merge. Merging will now be described in further detail.

As shown in FIG. 7, matching records that should be merged enter/re-enter the trust framework 739 at the trust score calculator 758 where the trust score for each field is calculated/re-calculated. These matching records are then merged based on their trust scores at the cell level survivorship module 738. If the records are merged, they form a single consolidated master record that contains the best version of the data from the matching records. A merge typically results in the replacement of one or more fields in a first reference data record by one or more fields in one or more additional reference data record(s).

A merge of multiple data fields and records may occur at the cell level survivorship step 1274 in FIG. 12. This merge is deterministic, meaning that the best fields are selected for inclusion in the master record by using an indicator of the preferred data. In some embodiments, this indicator of preference includes the trust score calculated by the trust score calculator 758. Less preferred data might include lower scoring data under the trust framework 739, where lower scores indicate less reliable data. Less preferred lower reliability data is thereby excluded from the master record based on trust score, in some embodiments.

Before concluding at step 1264, the match process 1200 consolidates (merges) the matching records into a best version and stores this best version of the available reference data into the master reference store 760. FIG. 14 illustrates an exemplary master record 1457 that contains merged data from the two matching data records shown in FIG. 13. Master record 1457 contains the trusted and consolidated (merged) cell values of these two records. As shown in FIG. 15, the merge is deterministic and the highest scored cell between each field of the two records is selected for inclusion in the master record 1457. Thus, in this example, the trust framework 739 has created the master record 1457 that is the best version of truth for this entity's data. In some embodiments, the master record 1457 is then stored in the master reference store 760. In some embodiments, the master record 1457 is immediately available to the consumers of reference data 709.

As previously discussed, the trust framework 739 of some embodiments applies cell level survivorship through the cell level survivorship module 738 while consolidating cells from the reference data records. In some embodiments, applying cell level survivorship during a merge requires the cell level survivorship module 738 to maintain content metadata for each field of each record that was merged.

As mentioned above, two examples of content metadata are history and lineage. History of data is the historical family tree of the data cells as they change over time. History includes parents and children of data at each point in time. History also includes all factors that could affect the data at each point in time. For instance, history includes every value ever received for a particular record, and the source of this value, irrespective of whether the value was ever merged into a master reference record. In these embodiments, lineage only includes values of each field in the master reference record that were at some point the value of that field. In other words, lineage is only the line in the tree followed by a particular data that has survived over time and the reason that particular data has survived. Other examples of content metadata maintained by some embodiments include: (1) trust parameters for data in a base object, (2) validation results for data in the base object, (3) cleansed and tokenized data to prepare for matching.

Regardless of how data enters the trust framework 739, cell level survivorship, including content metadata, may be applied whether data consolidation occurs through updating or through a match and merge process. As mentioned above, some embodiments locate reference data records that require consolidation by using cross-reference keys, while other embodiments employ a match process. As illustrated in FIG. 7, the trust framework 739 may retrieve the reference data records intended for processing from either the initial processor 745 (for the case of updating by using cross reference keys after loading and staging) or from the match engine 755 (for the case of maintenance of data in the master reference store 760 through a match and merge process).

Un-Merge

The advantage of tracking content metadata (e.g., lineage and history of data) will be further described by reference to an un-merge functionality of some embodiments. At times, a merge procedure will combine reliable reference data with unreliable reference data. Unreliable data may contain an error or may simply be misinterpreted data. For instance, an entity "Fred Doe" may be mistakenly interpreted to be the same as an entity "F Doe." However, it may later be determined that "F Doe" is actually a separate entity "F Doe, Jr." For this instance, some embodiments provide an un-merge procedure that allows the improperly merged data for F Doe, Jr., to be extracted from the reference data for Fred Doe. At other times, a change in the matching rules will cause previous merges to become obsolete, and require new merges to be performed. For these instances that result in undesired or inappropriate merges, some embodiments provide a sophisticated un-merge procedure.

The un-merge procedure will restore the various cells of a master reference record for Fred Doe to a state prior to the merge and then re-apply all subsequent merges that did not include the (undesirable) reference data for F Doe, Jr. Un-merge differs from a simple "undo" because it does not reverse the change to a single record. Rather, un-merge iterates through the content metadata (e.g., the history and lineage of data) to return a set of records and relationships affected by the un-merge to a state as if the merge with the incorrect and/or unreliable data had never occurred.

Figure 16:
FIG. 16 illustrates one instance of an un-merge procedure.

FIG. 16 illustrates one instance of such an un-merge procedure. As shown in FIG. 16, reference data is merged sequentially from three difference sources: A, B, and C. As illustrated in the source column 1605, it is later determined that data from source C is unreliable or has been improperly merged with data from sources A and B. Merged Record column 1610 shows the reference data record subsequent each merge from source column 1605 at each point in time. Un-Merged Record column 1615 illustrates the reference data record at each point in time following an un-merge procedure that culls source C's data from the entire reference data record shown in FIG. 16. This column further illustrates the reference data record placed in a condition as if the merges with the undesired data had never occurred, but as if all subsequent events (desirable merges) had still occurred.

Thus, some embodiments provide an un-merge functionality that dramatically improves data reliability and quality. Moreover, some embodiments provide for several additional mechanisms such as updating, and a match and merge process, that promote a unified, consolidated view that is typically the best version of the available data. Further, these embodiments provide these functionalities and processes in real time. One of ordinary skill will also recognize that the invention can be embodied in other specific forms without departing from the spirit of the invention, even though the invention has been described with reference to numerous specific details. In view of the foregoing, one of ordinary skill in the art would understand that the invention is not to be limited by the foregoing illustrative details, but rather is to be defined by the appended claims.

What is claimed is:

1. A system for maintaining master reference data for entities, said system comprising:
   a plurality of data storages for storing a plurality of reference data sets, wherein each reference data set identifies a particular entity, wherein each of a plurality of entities has a plurality of reference data sets stored in a plurality of the data storages,
   wherein one of the data storages is a master reference data storage that stores a master reference data set for each of a plurality of entities, wherein the master reference data set for a particular entity represents the most reliable reference data set stored for the particular entity in any of the data storages;
   a master reference manager for receiving reference data sets in real time, modifying at least one master reference data set in real time based on a received reference data set, and maintaining content metadata for at least one master reference data set,
   wherein the master reference manager includes a trust framework for updating master reference data sets in real time,
   wherein a master reference data set includes a set of data fields, wherein updating the master reference data set includes changing a current value of a particular data field of the master reference data set when the master reference manager receives a reference data set that has a value for the particular data field that is more trustworthy than the current value of the particular data field.

2. The system of claim 1, wherein the content metadata includes lineage and history of data that affected the reliability of a master reference data set.

3. The system of claim 1, wherein the trust framework includes a trust score calculator that calculates in real-time trust scores for reference data sets that are to be combined.

4. The system of claim 1, wherein the master reference manager modifies content metadata of at least one particular master reference data set when the master reference manager updates the particular master reference data set.

5. The system of claim 1, wherein the trust framework is further for merging master reference data sets in real time.

6. The system of claim 1, further comprising:
 a) a trust score calculator for calculating a trust score for data values of reference data sets; and
 b) a set of configurable rules by which the trust score calculator calculates the trust score of data values of reference data sets.

7. The system of claim 6, wherein the set of configurable rules include: (1) rules specifying the trustworthiness of a particular field in a particular data set, (2) rules specifying how the trustworthiness of a particular value changes over time based on the date and time the value was changed, and (3) business rules that specify how the trustworthiness of a value is modified based on formulas used to validate a particular type of data.

8. A system for maintaining master reference data for entities, said system comprising:
 a plurality of data storages for storing a plurality of reference data sets, wherein each reference data set identifies a particular entity, wherein each of a plurality of entities has a plurality of reference data sets stored in a plurality of the data storages,
 wherein one of the data storages is a master reference data storage that stores a master reference data set for each of a plurality of entities, wherein the master reference data set for a particular entity represents the most reliable reference data set stored for the particular entity in any of the data storages;
 a master reference manager for receiving reference data sets in real time, modifying at least one master reference data set in real time based on a received reference data set, and maintaining content metadata for at least one master reference data, wherein the master reference manager includes a trust framework for merging master reference data sets in real-time,
 wherein a particular master reference data set includes a set of data fields, wherein merging the particular master reference data set includes changing a current value of a particular data field of the particular master reference data set when the master reference manager identifies another reference data set that has a value for the particular data field that is more trustworthy than the current value of the particular data field in the particular master reference data set.

9. The system of claim 8, wherein the trust framework is further for updating master reference data sets in real time.

10. The system of claim 8, wherein the trust framework includes a trust score calculator that calculates in real-time trust scores for reference data sets that are to be merged.

11. The system of claim 8, wherein the master reference manager modifies content metadata of at least one particular master reference data set when the master reference manager merges the particular master reference data set with another master reference data set.

12. The system of claim 8, wherein to merge two master reference data sets, the master reference manager determines whether the two master reference data sets have a first set of data fields that match.

13. A system for maintaining master reference data for entities, said system comprising:
 a plurality of data storages for storing a plurality of reference data sets, wherein each reference data set identifies a particular entity, wherein each of a plurality of entities has a plurality of reference data sets stored in a plurality of the data storages,
 wherein one of the data storages is a master reference data storage that stores a master reference data set for each of a plurality of entities, wherein the master reference data set for a particular entity represents the most reliable reference data set stored for the particular entity in any of the data storages;
 a master reference manager for receiving reference data sets in real time, modifying at least one master reference data set in real time based on a received reference data set, and maintaining content metadata for at least one master reference data set, wherein the master reference manager includes a trust framework for merging master reference data sets in real-time,
 wherein to merge two master reference data sets, the master reference manager determines whether the two master reference data sets have a first set of data fields that match, wherein when the two master reference data sets do not have the first set of data fields that match but have a second set of data fields that match, the master reference manager identifies the two master reference data sets as potentially matching master reference data sets that should be examined by a system operator to determine whether the two master reference data sets are matching and need to be merged.

14. A system for maintaining master reference data for entities, said system comprising:
 a plurality of data storages for storing a plurality of reference data sets, wherein each reference data set identifies a particular entity, wherein each of a plurality of entities has a plurality of reference data sets stored in a plurality of the data storages,
 wherein one of the data storages is a master reference data storage that stores a master reference data set for each of a plurality of entities, wherein the master reference data set for a particular entity represents the most reliable reference data set stored for the particular entity in any of the data storages;
 a master reference manager for receiving reference data sets in real time, modifying at least one master reference data set in real time based on a received reference data set, and maintaining content metadata for at least one master reference data set,
 wherein the master reference manager is for performing an unmerge operation, wherein the unmerge operation divides a first master reference data set into second and third master reference data sets that at one time were merged to produce the first master reference data set.

15. The system of claim 14, wherein the unmerge operation uses the content metadata for the first master reference data set to perform the unmerge operation.

16. The system of claim 14, wherein the master reference manager performs that unmerge operation after a changing of a set of matching criteria that is used to merge matching master reference data sets.

17. A method for maintaining master reference data for entities, the method comprising:
storing a plurality of reference data sets at a plurality of data storages, wherein each reference data set identifies a particular entity, wherein each of a plurality of entities has a plurality of reference data sets stored in a plurality of the data storages, wherein a plurality of the reference data sets are master reference data sets, wherein a master reference data set for a particular entity represents the most reliable reference data set stored for the particular entity in any of the data storages;
receiving reference data sets in real time;
modifying at least one master reference data set in real time based on a received reference data set; and
maintaining content metadata for at least one master reference data set,
wherein modifying the master reference data set in real time comprises updating master reference data sets in real time, wherein a particular master reference data set includes a set of data fields, wherein updating the particular master reference data set includes changing a current value of a particular data field of the particular master reference data set when the master reference manager receives a reference data set that has a value for the particular data field that is more trustworthy than the current value of the particular data field.

18. The method of claim 17, wherein the content metadata includes lineage and history of data that affected the reliability of a master reference data set.

19. The method of claim 17 further comprising modifying content metadata of at least one particular master reference data set when the master reference manager updates the particular master reference data set.

20. A method for maintaining master reference data for entities, the method comprising:
storing a plurality of reference data sets at a plurality of data storages, wherein each reference data set identifies a particular entity, wherein each of a plurality of entities has a plurality of reference data sets stored in a plurality of the data storages, wherein a plurality of the reference data sets are master reference data sets, wherein a master reference data set for a particular entity represents the most reliable reference data set stored for the particular entity in any of the data storages;
receiving reference data sets in real time;
modifying at least one master reference data set in real time based on a received reference data set; and
maintaining content metadata for at least one master reference data set,
wherein modifying the master reference data set in real time comprises merging master reference data sets in real time, wherein a particular master reference data set includes a set of data fields, wherein merging a particular master reference data set includes changing a current value of a particular data field of the particular master reference data set when the master reference manager identifies another reference data set that has a value for the particular data field that is more trustworthy than the current value of the particular data field in the particular master reference data set.

21. The method of claim 20 further comprising modifying content metadata of at least one particular master reference data set when merging the particular master reference data set with another master reference data set.

22. The method of claim 20 further comprising determining whether two master reference data sets have a first set of data fields that match in order to determine whether to merge the two master reference data sets.

23. A method for maintaining master reference data for entities, the method comprising:
storing a plurality of reference data sets at a plurality of data storages, wherein each reference data set identifies a particular entity, wherein each of a plurality of entities has a plurality of reference data sets stored in a plurality of the data storages, wherein a plurality of the reference data sets are master reference data sets, wherein a master reference data set for a particular entity represents the most reliable reference data set stored for the particular entity in any of the data storages;
receiving reference data sets in real time;
modifying at least one master reference data set in real time based on a received reference data set;
maintaining content metadata for at least one master reference data set;
determining whether two master reference data sets have a first set of data fields that match in order to determine whether to merge the two master reference data sets,
wherein when the two master reference data sets do not have the first set of data fields that match, determining whether the two master reference data sets have a second set of data fields that match,
when the second set of data fields match in the two master reference data sets, identifying the two master reference data sets as potentially matching master reference data sets that should be examined by a system operator to determine whether the two master reference data sets are matching and need to be merged.

24. A method for maintaining master reference data for entities, the method comprising:
storing a plurality of reference data sets at a plurality of data storages, wherein each reference data set identifies a particular entity, wherein each of a plurality of entities has a plurality of reference data sets stored in a plurality of the data storages, wherein a plurality of the reference data sets are master reference data sets, wherein a master reference data set for a particular entity represents the most reliable reference data set stored for the particular entity in any of the data storages;
receiving reference data sets in real time;
modifying at least one master reference data set in real time based on a received reference data set;
maintaining content metadata for at least one master reference data set, and
performing an unmerge operation, wherein the unmerge operation divides a first master reference data set into second and third master reference data sets that at one time were merged to produce the first master reference data set.

25. The method of claim 24, wherein the unmerge operation uses the content metadata for the first master reference data set to perform the unmerge operation.

26. The method of claim 24, wherein the unmerge operation is performed after a change of a set of matching criteria that is used to merge matching master reference data sets.

27. A computer readable medium storing a computer program for maintaining master reference data for entities, the computer program comprising sets of instructions for:
storing a plurality of reference data sets at a plurality of data storages, wherein each reference data set identifies a particular entity, wherein each of a plurality of entities has a plurality of reference data sets stored in a plurality of the data storages, wherein a plurality of the reference data sets are master reference data sets, wherein a master reference data set for a particular entity represents the most reliable reference data set stored for the particular entity in any of the data storages;

receiving reference data sets in real time;

modifying at least one master reference data set in real time based on a received reference data set;

maintaining content metadata for at least one master reference data set;

determining whether two master reference data sets have a first set of data fields that match in order to determine whether to merge the two master reference data sets;

determining whether the two master reference data sets have a second set of data fields that match when the two master reference data sets do not have the first set of data fields that match; and when the second set of data fields match in the two master reference data sets, identifying the two master reference data sets as potentially matching master reference data sets that should be examined by a system operator to determine whether the two master reference data sets are matching and need to be merged.

28. The computer readable medium of claim 27, wherein the content metadata includes lineage and history of data that affected the reliability of a master reference data set.

* * * * *